United States Patent
Levy et al.

(10) Patent No.: US 7,848,265 B2
(45) Date of Patent: Dec. 7, 2010

(54) APPARATUS AND METHOD FOR AUTOMATIC CONFERENCE INITIATION

(75) Inventors: Jacqueline Levy, Sunnyvale, CA (US); Michael Sharland, Santa Clara, CA (US); Jay Maskell, Morgan Hill, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1062 days.

(21) Appl. No.: 11/524,593

(22) Filed: Sep. 21, 2006

(65) Prior Publication Data

US 2008/0084984 A1    Apr. 10, 2008

(51) Int. Cl.
*H04L 12/16* (2006.01)
(52) U.S. Cl. ........................ 370/260; 709/204
(58) Field of Classification Search ............... 370/260; 709/204
See application file for complete search history.

(56) References Cited

U.S. PATENT DOCUMENTS

| | | | |
|---|---|---|---|
| 2003/0108002 A1* | 6/2003 | Chaney et al. | 370/261 |
| 2004/0161080 A1 | 8/2004 | Digate et al. | |
| 2005/0027581 A1* | 2/2005 | Kjesbu et al. | 705/8 |
| 2006/0067250 A1* | 3/2006 | Boyer et al. | 370/260 |
| 2007/0094374 A1* | 4/2007 | Karia et al. | 709/223 |
| 2007/0121580 A1* | 5/2007 | Forte et al. | 370/351 |
| 2007/0264989 A1* | 11/2007 | Palakkal et al. | 455/416 |

FOREIGN PATENT DOCUMENTS

EP    1531635    3/2007

* cited by examiner

*Primary Examiner*—Creighton Smith (57) ABSTRACT

In some embodiments, an automatic conference initiator system may include one or more of the following features: (a) a memory having, (i) an automatic conference initiator program that initiates a conference when conferees are determined available based upon presence information, and (b) a processor coupled to the memory that executes the automatic conference initiator program.

20 Claims, 9 Drawing Sheets

FIG. 9 excellent# APPARATUS AND METHOD FOR AUTOMATIC CONFERENCE INITIATION

FIELD OF THE INVENTION

This invention relates to telecommunications systems. In particular, this invention relates to collaboration systems. More particularly, this invention relates to a presence based communication system that allows a user to specify that a conference should be automatically initiated as soon as required conferees become available.

BACKGROUND OF THE INVENTION

The development of various voice over IP protocols such as the H.323 Recommendation and the Session Initiation Protocol (SIP) has led to increased interest in multimedia conferencing. In such conferencing, typically, a more or less central server or other device manages the conference and maintains the various communications paths to computers or other client devices being used by parties to participate in the conference. Parties to the conference may be able to communicate via voice and/or video through the server and their client devices.

Instant messaging can provide an added dimension to multimedia conferences. In addition to allowing text chatting, instant messaging systems such as the Microsoft Windows Messenger™ system can allow for transfer of files, document sharing and collaboration, collaborative whiteboarding, and even voice and video. A complete multimedia conference can involve multiple voice and video streams, the transfer of files, marking-up of documents, and whiteboarding.

Presence-based communications applications are entering the mainstream telecommunications environment. In such applications, a user maintains one or more "contact lists" of other parties whose presence status is to be monitored and displayed to the user. When a contact's presence information indicates the contact is available, the user can then contact them. The user can then contact the other party for example via a telephone call.

In computer and telecommunications networks, presence information conveys availability and willingness of a user (called a presentity) to communicate. A users client provides presence information to a presence service to be stored and distributed to other users (called watchers) to convey its communication state. Presence information has wide application in voice over IP (VoIP) and instant messaging (IM).

A user client may publish a presence state to indicate its current communication status. This published state informs others that wish to contact the user of the user's availability and willingness to communicate. The most common use of presence today is the status indicator displayed on most instant messaging clients. A simpler everyday example is the 'on-hook' or 'off-hook' state of a telephone receiver, resulting in a distinctive ring tone (e.g., a busy signal) for a caller. Some states that offer extended information on the user's availability are "free for chat", "away", "do not disturb", and "out to lunch", which are often seen on many modern instant messaging clients. Rich information such as user mood and location may be also included. Presence is different from traditional 'on-hook' telephone status in that it deals with the user not the device (you want to talk to a person, not to a telephone).

Currently, when a user initiates a conference for a pre-designated list of conference attendees, some of the attendees may not be available to receive voice calls. As a result attendees that the user thought were necessary for a productive meeting are not included and time is wasted.

Furthermore, even in presence based communication systems where a user can look at the availability of the potential conferees, to do so is time-consuming. Even using a Tell-Me-When feature that notifies the user when a particular person is available for communications, the user needs to set up the feature on many people potentially, and keep track of when all of them are available. Again, this is time-consuming.

Therefore, it is desirable to have a system that allows a presence based communication system user to initiate a conference automatically when the desired parties are available.

SUMMARY OF THE INVENTION

These and other drawbacks in the prior art are overcome in large part by a system and method according to embodiments of the present invention.

In some embodiments, a method for automatic conference initiation may include one or more of the following steps: (a) receiving a number of conferees for a conference, (b) determining if the conferees were available for the conference based upon presence information, (c) notifying a conference initiator that a predetermined number of conferees are available to begin the conference, (d) receiving input on the predetermined number of conferees that must be present before the conference can begin, (e) receiving input on required conferees that must be present before the conference can begin, (f) receiving notification instructions on how to notify the conference initiator when the conference can begin, and (g) obtaining presence information from a presence based telecommunications server.

In some embodiments, an automatic conference initiator system may include one or more of the following features: (a) a memory having, (i) an automatic conference initiator program that initiates a conference when conferees are determined available based upon presence information, and (b) a processor coupled to the memory that executes the automatic conference initiator program.

In some embodiments, a machine readable medium comprising machine executable instructions may include one or more of the following features: (a) receive instructions that receive inputted conferees to a scheduled conference, (b) determination instructions that determine if the conferees are available based upon presence information, (c) notification instructions that notify a conference initiator if a predetermined number of conferees are available, (d) selection instructions that allow the conference initiator to select how the conference initiator is notified when the conference can begin, (e) presence instructions that obtains presence information for the conferees, and (f) conference instructions that allow the conference initiator to determine if the conference initiator wants to initiate the conference when it has been determined that the conference can be initiated.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings.

Embodiments of the present invention disclose presence-based automatic conference initiation with minimum conferee requirements. This enables a user in a presence based communication system to indicate a conference should be automatically initiated when a specified minimum subset of a pre-designated list of potential conferees become available.

When setting up the request, the worker can indicate a minimum number of the potential conferees that must be available to begin the conference. Further, upon set up, the user can indicate a subset of the potential conferees that must be available for the conference to begin. Finally, the user can indicate whether he wants to confirm the conference setup. If so, when the desired conferees become available the user can receive a pop-up upon which he must hit "OK" before the conference is initiated. Otherwise, the conference is initiated without confirmation.

Embodiments of the present invention allow a user to reduce wasted time attending a conference without all required parties. The user need not waste time determining when all the required parties are available. The user does not waste time waiting to start a conference once the required parties are available.

Presence based communication systems, such as Siemens HiPath OpenScape™, have presence trigger features, such as the Tell-Me-When feature, which allow a user to be automatically notified when another user's presence status changes. For example, a worker uses Tell-Me-When to be notified via a Windows pop-up that a particular user is now available for voice calls. In addition, collaboration systems allow a worker to click to start a conference with a pre-designated list of people.

Embodiments of the present invention allow a user to indicate a conference should be initiated only when all required potential conferees in a pre-designated list of people become available. When setting up the request the user can indicate a minimum number of parties that must be available before the conference can be initiated as is described in detail below. This defaults to 'all parties' but the user may sometimes want to choose a smaller number if they believe the conference is worthwhile with fewer than all the parties. Further, the user can indicate which potential conferees are required to be available before the conference can be initiated. This defaults to 'all parties', but the worker may sometimes want to specify a subset of all the parties if they believe the conference is worthwhile even with only the specified key people.

The user can indicate whether he wants to confirm the conference setup. If so, when all required potential conferees become available, the user receives a pop-up upon which he must hit "OK" before the conference is initiated. Otherwise, the conference is initiated without confirmation. Embodiments of the present invention remove these disadvantages. Initiating a conference only when all desired conferees are available becomes a one step procedure.

Furthermore, this invention provides flexibility not currently available by allowing the user to indicate the minimum number of conferees that must be available and what subset of the conferees must be available before the conference can be started. These additional options protect the user from wasting time when not enough people are available or when key people are not available. It also protects the worker from wasting time waiting for all potential conferees to become available once key people or enough people are available.

Figure 1:
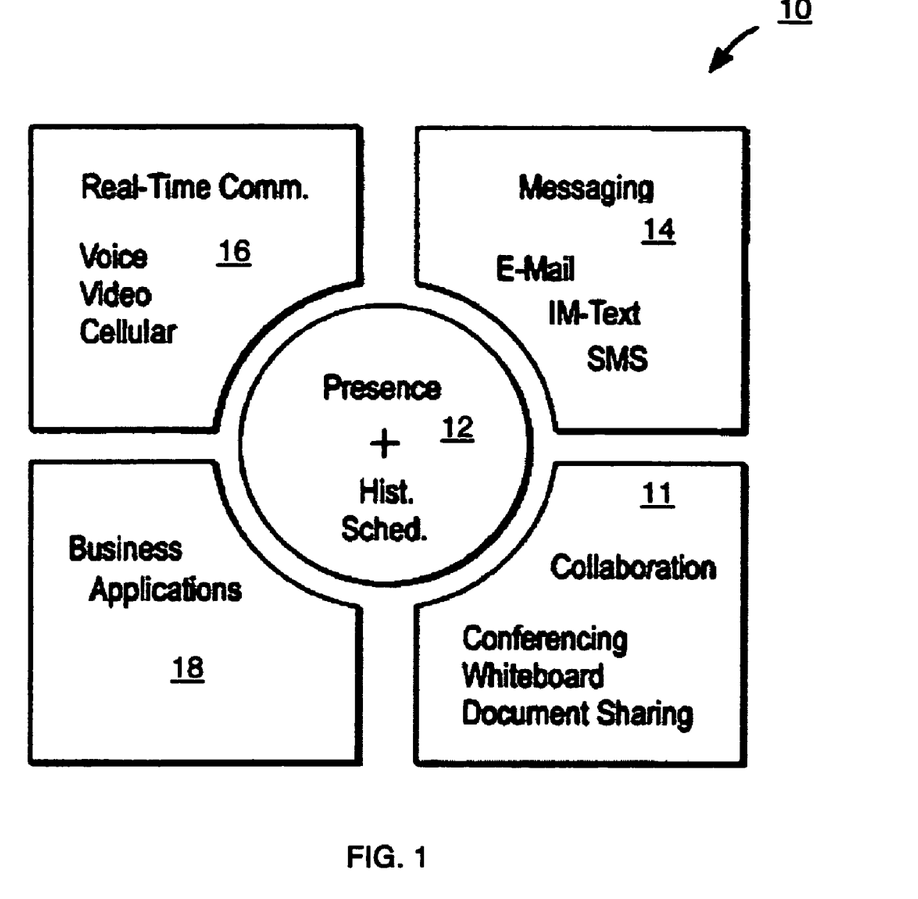
FIG. 1 illustrates a multi-modal presence system according to embodiments of the present invention.

Turning now to the drawings and with particular attention to FIG. 1, a diagram schematically illustrating a multi-modal presence-based telecommunications system 10 according to an embodiment of the present invention is shown. Telecommunications system 10 includes real-time communication capabilities 16, messaging capabilities 14, business applications 18, and collaboration applications 11. Real-time communication 16 can include, for example, voice, video, or cellular. Messaging 14 includes e-mail, instant messaging, short messaging service (SMS) or other text-based services. Business applications 18 can include, for example, Customer Relationship Management (CRM) and Enterprise Resource Planning (ERP) software packages. Collaboration applications 11 can include conferencing, whiteboarding, and document sharing applications.

In addition, a multi-modal presence feature 12 according to embodiments of the present invention can provide presence services, including history, and scheduling information, aggregated across various media 14, 16, 18, and 11.

It is noted that while illustrated as a multi-modal presence system, embodiments of the present invention are equally applicable to systems employing only single presence-based media. Thus, the figures are exemplary only.

Figure 2:
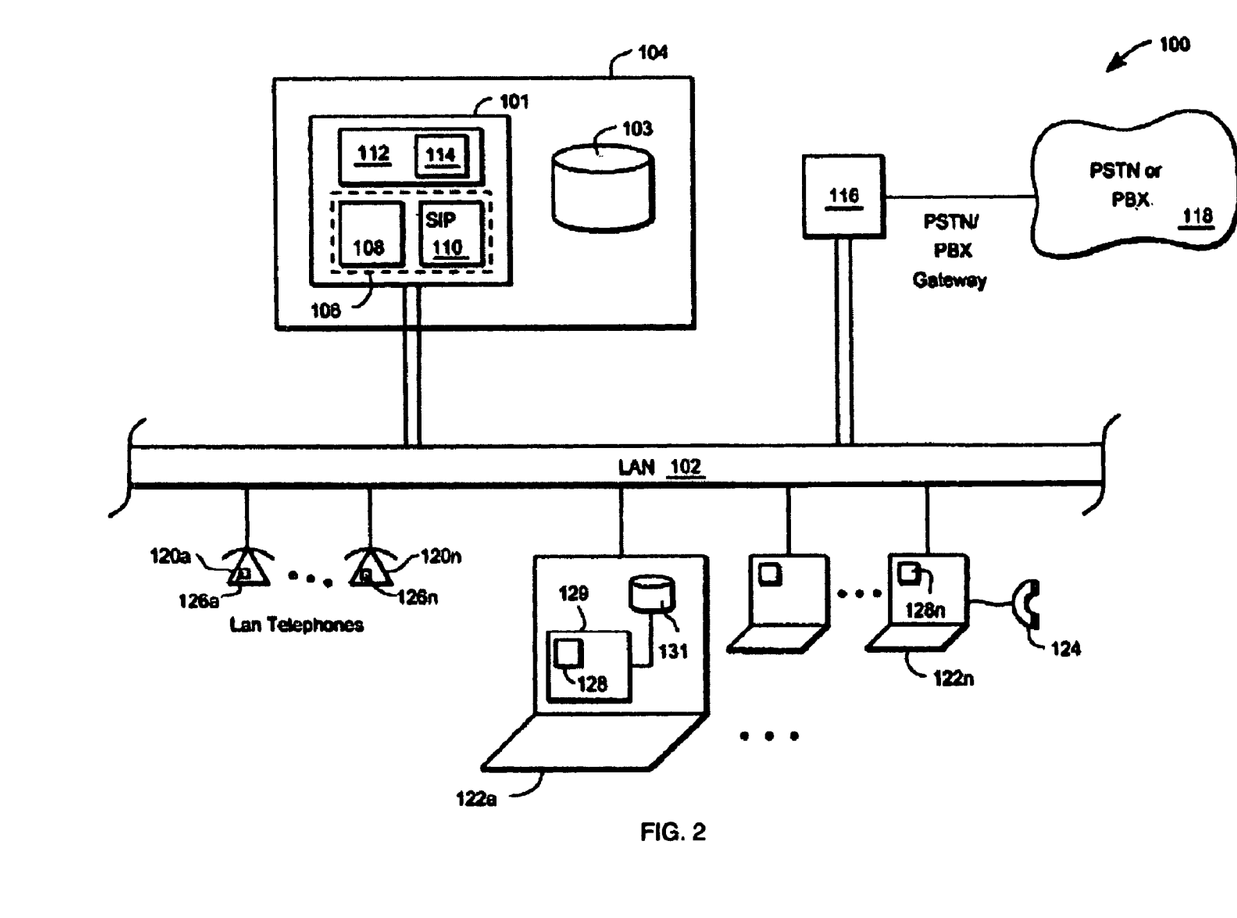
FIG. 2 is a diagram of a conference system according to some embodiments of the present invention.

Referring now to FIG. 2, a diagram of an exemplary telecommunications or conference system 100 in some embodiments is shown. As shown, system 100 may include a local area network (LAN) 102. LAN 102 may be implemented using a TCP/IP network and may implement voice or multimedia over IP using, for example, the Session Initiation Protocol (SIP). Operably coupled to local area network 102 is a server 104. Server 104 may include one or more controllers 101, which may be embodied as one or more microprocessors, and memory 103 for storing application programs and data. Controller 101 may implement an instant messaging system 106. Instant messaging system 106 may be embodied as a SIP proxy/register and SIMPLE (Session Initiation Protocol for Instant Messaging and Presence Leveraging Extensions) clients or other instant messaging system (Microsoft Windows Messenger™ software) 110. In some embodiments, if possible and practicable, instant messaging system 106 may implement or be part of the Microsoft.Net™ environment and/or Real Time Communications server or protocol (RTC) 108.

In addition, in some embodiments, a collaboration system 114 may be provided, which may be part of an interactive suite of applications 112, run by controller 101. In addition, an action prompt module 115 may be provided, which detects occurrences of action cues and causes action prompt windows to be launched at client devices 122. Collaboration system 114 may allow users of the system to become participants in a conference or collaboration session.

Also coupled to LAN 102 is a gateway 116 which may be implemented as a gateway to a private branch exchange (PBX), the public switched telephone network (PSTN) 118, or any of a variety of other networks, such as a wireless or cellular network. In addition, one or more LAN telephones 120a-120n and one or more computers 122a-122n may be operably coupled to LAN 102. In some embodiments, one or more other types of networks may be used for communication between server 104, computers 122a-122n, telephones 120a-120n, gateway 116, etc. For example, in some embodiments, a communications network might be or include the Internet, the World Wide Web, or some other public or private computer, cable, telephone, client/server, peer-to-peer, or communications network or intranet. In some embodiments, a communications network also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL connections, etc. Moreover, as used herein, communications include those enabled by wired or wireless technology. Also, in some embodiments, one or more client devices (e.g., the computers 122a-122n) may be connected directly to the server 104.

The computers 122a-122n may be personal computers implementing the Windows XP™ operating system and thus, Windows Messenger™ instant messenger system, or SIP clients running on the Linux™, or other operating system running voice over IP clients or other clients capable of participating in voice or multimedia conferences. In addition, computers 122a-122n may include telephony and other multimedia messaging capability using, for example, peripheral cameras, Web cams, microphones and speakers (not shown) or peripheral telephony handsets 124, such as the Optipoint™ handset, available from the Siemens™ Corporation. In other embodiments, one or more of the computers may be implemented as wireless telephones, digital telephones, or personal digital assistants (PDAs). Thus, the figures are exemplary only. As shown with reference to computer 122a, the computers may include one or more controllers 129, such as Pentium™ type microprocessors, and storage 131 for applications and other programs.

Finally, computers 122a-122n may implement interaction services 128a-128n in some embodiments. Interaction services 128a-128n may allow for interworking of phone, buddy list, instant messaging, presence, collaboration, calendar and other applications. In addition, interaction services 128 may allow access to the collaboration system or module 114 and action prompt module 115 of server 104.

Figure 3:
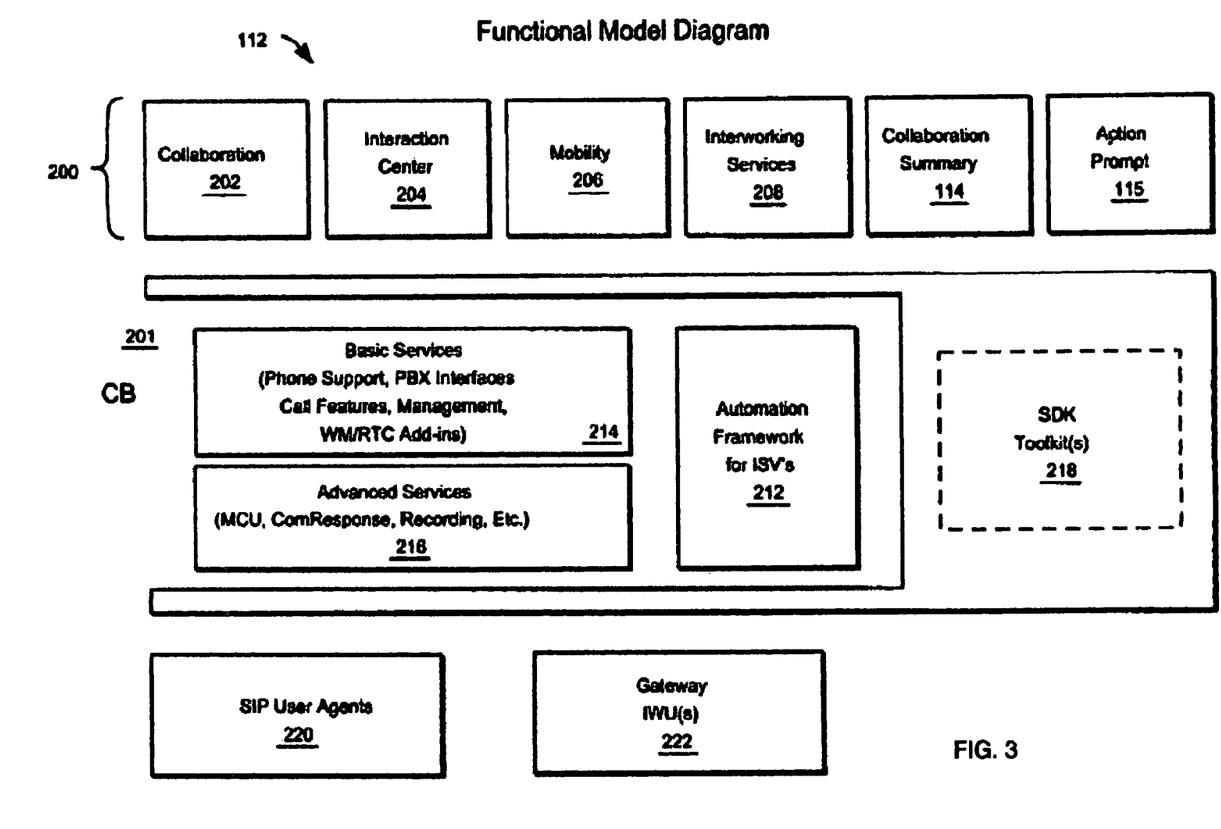
FIG. 3 is a diagram illustrating a conference collaboration system according to some embodiments of the present invention.

Turning now to FIG. 3, a functional model diagram illustrating collaboration system 114 is shown. More particularly, FIG. 3 is a logical diagram illustrating a particular embodiment of a collaboration server 104. Server 104 includes a plurality of application modules 200 and a communication broker (CB) module 201. One or more of the application modules and communication broker module 201 may include an inference engine, i.e., a rules or heuristics based artificial intelligence engine for implementing functions in some embodiments. In addition, server 104 provides interfaces, such as APIs (application programming interfaces) to SIP phones or other SIP User Agents 220 and gateways/interworking units 222.

According to the embodiment illustrated, broker module 201 includes a basic services module 214, an advanced services module 216, an automation module 212, and a toolkit module 218. Automation module 212 implements an automation framework for ISVs (independent software vendors) 212 that allow products, software, etc. provided by such ISVs to be used with or created by server 104.

Basic services module 214 functions to implement, for example, phone support, PBX interfaces, call features and management, as well as Windows Messaging™ software and RTC add-ins, when necessary. The phone support features allow maintenance of and access to buddy lists and provide presence status.

Advanced services module 216 implements functions such as presence, multipoint control unit or multi-channel conferencing unit (MCU), recording, and the like. MCU functions are used for voice conferencing and support ad hoc and dynamic conference creation from a buddy list following the SIP conferencing model for ad hoc conferences. In certain embodiments, support for G.711, G.723.1, or other codecs is provided. Further, in some embodiments, the MCU can distribute media processing over multiple servers using the MEGACO/H.248 protocol. In some embodiments, an MCU may provide the ability for participants to set up ad hoc voice, data, or multimedia conferencing sessions. During such conferencing sessions, different client devices (e.g., computers 122a-122n) may establish channels to the MCU and server 104, the channels carrying voice, audio, video and/or other data from and to participants via their associated client devices. In some cases, more than one participant may be participating in the conference via the same client device. For example, multiple participants may be using a telephone (e.g., telephone 126a) located in a conference room to participate in the conference. Thus, the multiple participants are aggregated behind a single channel to participate in the conference. Also, in some cases, a participant may be using one client device (e.g., a computer) or multiple devices (e.g., a computer and a telephone) to participate in the conference. The Real-Time Transport Protocol (RTP) and the Real Time Control Protocol (RTCP) may be used to facilitate or manage communications or data exchanges between the client devices for the participants in the conference.

In some embodiments an MCU may include a conference mixer application or logical function that provides the audio, video, voice, etc. data to the different participants. The MCU may handle or manage establishing the calls in and out to the different participants and establish different channels with the client devices used by the participants. Server 104 may include, have access to, or be in communication with additional applications or functions that establish a list of participants in the conference as well as identify the participants speaking at a given moment during the conference.

Presence features provide device context for both SIP registered devices and user-defined non-SIP devices. Various user contexts, such as In Meeting, On Vacation, In the Office, etc., can be provided for. In addition, voice, e-mail, and instant messaging availability may be provided across the user's devices. The presence feature enables real time call control using presence information, e.g., to choose a destination based on the presence of a user's device(s). In addition, various components have a central repository for presence information and for changing and querying presence information. In addition, the presence module provides a user interface for presenting the user with presence information.

In addition, broker module 201 may include the ComResponse™ platform, available from Siemens Information and Communication Networks™, Inc. The ComResponse™ platform features include speech recognition, speech-to-text, and text-to-speech, and allows for creation of scripts for applications. The speech recognition and speech-to-text features may be used by collaboration summarization unit 114 and action prompt module 115.

In addition, real time call control is provided by a SIP API 220 associated with basic services module 214. That is, calls can be intercepted in progress and real time actions performed on them, including directing those calls to alternate destinations based on rules and or other stimuli. SIP API 220 also provides call progress monitoring capabilities and for reporting status of such calls to interested applications. SIP API 220 also provides for call control from the user interface.

Toolkit module 218 may provide tools, APIs, scripting language, interfaces, software modules, libraries, software drivers, objects, etc. that may be used by software developers or programmers to build or integrate additional or complementary applications.

According to the embodiment illustrated, the application modules include a collaboration module 202, an interaction center module 204, a mobility module 206, an interworking services module 208, a collaboration summarization module 114, and an action prompt module 115.

Collaboration module 202 allows for creation, modification or deletion of a collaboration or conference session for a group of participants or other users. Collaboration module 202 may further allow for invoking a voice conference from any client device. In addition, the collaboration module 202 can launch a multi-media conferencing package, such as the WebEX™ package. It is noted that the multi-media conferencing can be handled by other products, applications, devices, etc.

Interaction center 204 provides a telephony interface for both subscribers and guests. Subscriber access functions include calendar access and voicemail and e-mail access. The calendar access allows the subscriber to accept, decline, or modify appointments, as well as block out particular times. The voicemail and e-mail access allows the subscriber to access and sort messages.

Similarly, the guest access feature allows the guest access to voicemail for leaving messages and calendar functions for scheduling, canceling, and modifying appointments with subscribers. Further, the guest access feature allows a guest user to access specific data meant for them, e.g., receiving e-mail and fax back, etc.

Mobility module 206 provides for message forwarding and "one number" access across media, and message "morphing" across media for the subscriber. Further, various applications can send notification messages to a variety of destinations, such as e-mails, instant messages, pagers, and the like. In addition, a user can set rules that mobility module 206 uses to define media handling, such as e-mail, voice and instant messaging handling. Such rules specify data and associated actions. For example, a rule could be defined to say "If I'm traveling, and I get a voicemail or e-mail marked Urgent, then page me."

Further, collaboration summarization module 114 is used to identify or highlight portions of a multimedia conference and configure the portions sequentially for later playback. The portions may be stored or identified based on recording cues either preset or settable by one or more of the participants in the conference, such as a moderator. The recording cues may be based on vocalized keywords identified by the voice recognition unit of the ComResponse™ module, or may be invoked by special controls or video or whiteboarding or other identifiers.

The action prompt module 115 similarly allows a user to set action cues, which cause the launch of an action prompt window at the user's associated client device 122. In response, the client devices 122 can then perform various functions in accordance with the action cues.

Figure 4:
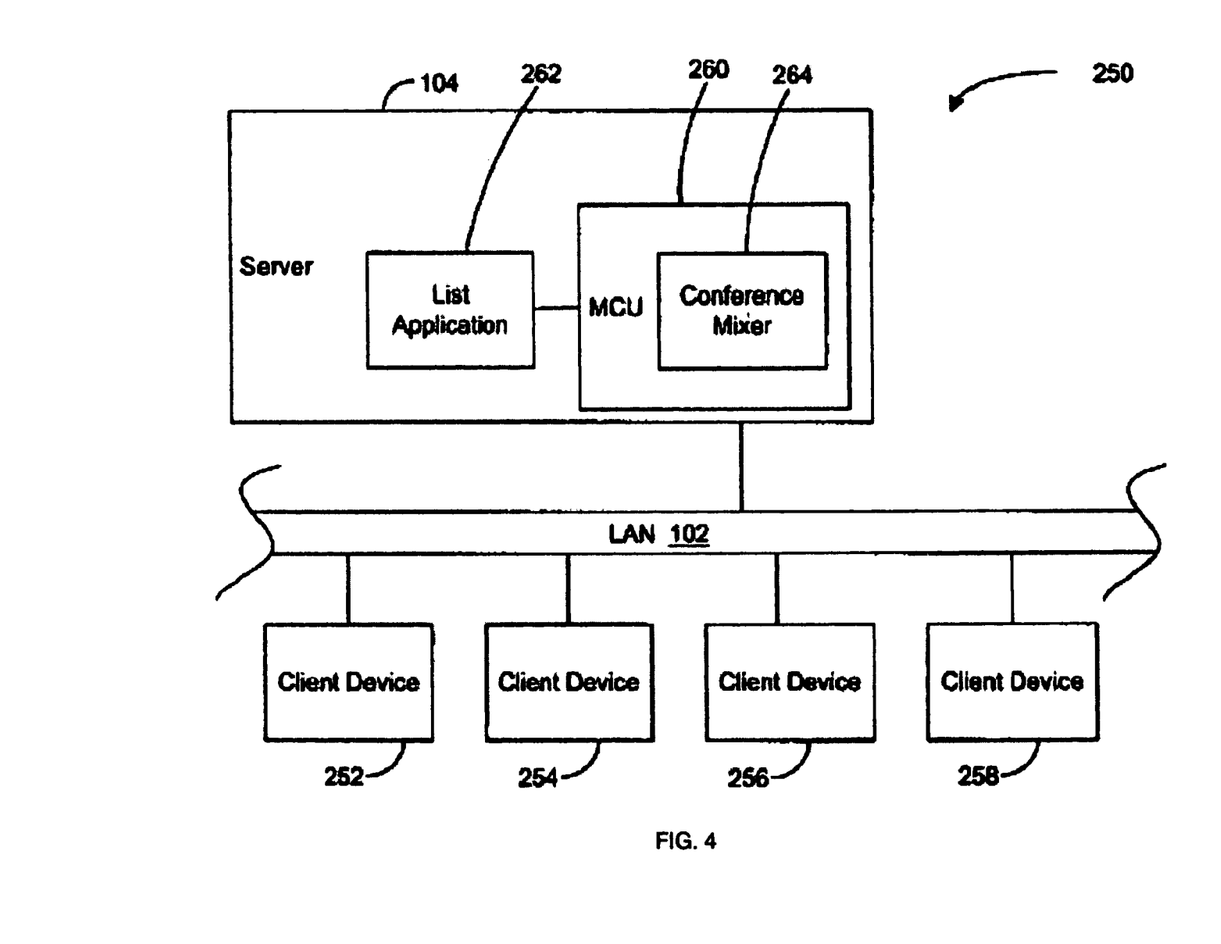
FIG. 4 is another diagram illustrating a conference collaboration system according to some embodiments of the present invention.

Now referring to FIG. 4, a system 250 is illustrated that provides a simplified version of, an alternative to, or a different view of system 100 for purposes of further discussion. In some embodiments, some or all of the components illustrated in FIG. 3 may be included in server 104 used with system 250, but they are not required. System 250 includes server 104 connected via LAN 102 to a number of client devices 252, 254, 256, and 258. Client devices may include computers (e.g., computers 122a-122n), telephones (e.g., telephones 126a-126n), PDAs, cellular telephones, workstations, or other devices. Client devices 252, 254, 256, and 258 each may include interaction services unit 128 previously discussed above. Server 104 may include MCU 260, which is in communication with list application or function 262. In some embodiments, list application 262 may be part of, include in, or integrated with MCU 260. MCU 260 may communicate directly or indirectly with one or more of client devices 252, 254, 256, and 258 via one or more channels. In some embodiments, other devices may be placed in the communication paths between MCU 260 and one or more of client devices 252, 254, 256, and 258 (e.g., a media processor may be connected to both MCU 260 and the client devices to perform mixing and other media processing functions).

When a conference is established or operating, MCU 260 may handle or manage establishing communication channels to the different client devices associated with participants in the conference. In some embodiments, MCU 260 may use RTP channels to communicate with various client devices. In addition, or as an alternative, MCU 260 may use side or other channels (e.g., HTTP channels) to communicate with the different client devices. For example, MCU 260 may provide audio and video data to a client device using RTP, but may provide information via a side or different channel for display by an interface or window on the client device.

MCU 260 also may include conference mixer 264. Conference mixer 264 may take samples of the incoming voice and other signals on the different channels and send them out to the participants' client devices so that all of the participants are receiving the same information and data. Thus, the conference may be broken down into a series of sample periods, each of which may have some of the same active channels. Different sample periods during a conference may include different active channels.

Mixer 264 may use one or more mixing algorithms to create the mixed sample(s) from the incoming samples. Mixer 264 may then provide the mixed sample(s) to the client devices.

In some embodiments, a sample may include or use voice or signal data from only some of the channels being used in a conference. For example, a sample may include voice or other signals only from the two channels having the loudest speakers or which are considered the most relevant of the channels during the particular sample time.

Each sample provided by mixer 264 may last for or represent a fixed or varied period of time during a conference. Different incoming samples may represent different periods of time during the conference. In addition, different samples may represent voice or other signals from different channels used by participants in the conference. In some embodiments, mixer 264 also may provide the incoming samples or a mixed sample created from one or more of the incoming samples to list application 262 or other part of MCU 260 so that one or both can determine who is speaking during the specific sample period or in the selected sample(s).

In some embodiments, mixer 264, using or in combination with its knowledge of a mixing algorithm used to create a mixed sample, may determine which participant is speaking during a mixed sample. Alternatively, in some embodiments, MCU 260 or list application 262 may be aware of the mixing algorithm and determine which participant is speaking during the mixed sample. List application 262 or MCU 260 may then provide information back to mixer 264 regarding who is speaking during the mixed sample.

When a conference is established or operating, list application 262 may determine the participants in the conference and may be used to identify particular speakers during the conference based on its list of participants. In some embodiments, list application 262 may be operating on a different device from MCU 260. For example, list application 262 may be part of another conferencing or signaling application that is operating on another device and communicates with MCU 260 via a first channel and with client devices directly or indirectly via a second channel. In some embodiments, list application 262 may provide information regarding the names of participants to MCU 260.

List application 262 may determine the list of participants from numerous sources or using numerous methods. For example, in some embodiments, list application 262 may access a list of invitees to the conference which may be manually entered or selected by a person organizing or facilitating the conference. As another example, list application 262 may receive information from MCU 260 regarding the client devices participating in the conference and/or the people associated with the client devices. As another example, MCU 260 may provide an audio stream or audio data to list application 262. The list application then may use voice or name recognition techniques to extract names or excerpts from the audio stream or data. Audio excerpts may be matched against a previously created list of names, specific key words, phrases, or idioms (e.g., "My name is Paul", "Hi, this is Sam"), buddy list entries, contact lists, etc. to help recognize names. As another example, if a conference is associated with a particular organization or group, information about members of the organization or group may be used to build or as input to the participant list. In a further example, the list application 262 may use protocol information from the audio or other sessions in a conference to build the participant list. As a more specific example, the list application 262 may obtain data from the CNAME, NAME, and/or EMAIL fields used in RTP/RTCP compliant audio sessions.

In some embodiments, MCU 260 or the list application 262 may be able to detect and differentiate between multiple participants aggregated behind or associated with a single channel. Thus, the MCU 260 or the list application 262 may be able to determine how many participants are sharing a channel in the conference and/or detect which of the participants are speaking at given points in time. MCU 260 or the list application 262 may use speaker recognition or other speech related technologies, algorithms, etc. to provide such functions.

In some embodiments, MCU 260 and/or the list application 262 may be able to detect which of the channels being used by the client devices participating in the conference are the most significant or indicate the level of activity of the different channels (which may be relative or absolute). MCU 260 or list application 262 may use voice activity detection, signal energy computation, or other technology, method or algorithm to provide such functions.

MCU 260 and/or list application 262 may correlate source information from the different channels to the list of participants previously created. For example, if there is only one speaker (e.g., a single source) on a channel to a client device, list application 262 may associate the owner of the client device with the speaker. If there are multiple sources (e.g., multiple speakers) on a channel, each speaker may be correlated to or associated with a name from the participation list or a name that was recognized via voice or speech recognition. If the multiple sources cannot be distinguished, a single participant may be associated with or assigned to the channel or to the source (e.g., the device providing the signal on the channel). Mixer 264 may provide the source and channel information to one or more of the client devices being used in the conference as a way of identifying a participant associated with the source and/or channel.

In some embodiments, based on information provided by list application 262 or other part of MCU 260, conference mixer 264 may identify zero, one or multiple participants for each channel which are active or which have been active over a certain amount of time (e.g., active within the last half second). In addition, conference mixer 264 may determine the significance of each of the channels. Conference mixer 264 can send out samples containing the audio or voice data for a period of time (e.g., fifty milliseconds) to client devices 252, 254, 256, and 258. The sample may include voice data from all of the active channels, only the most significant channels, or a fixed number of channels. In addition, mixer 264 may send information to the client devices regarding which channels and/or which speakers are active in the sample. In some embodiments, mixer 264 may be able to provide data regarding samples, speakers, etc. in real time or near to real time.

In some embodiments, mixer 264, as part of MCU 260, may send the mixed sample via one channel (e.g., an RTP based channel) and the speaker/channel information via a separate channel (e.g., an HTML communication via a Web server), particularly when the participant is using one client device (e.g., telephone 126a) to participate in the conference, provide audio to the conference, receive samples from mixer 264, etc. and a different client device (e.g., computer 122a) to receive information and interface data from mixer 264 regarding the conference. When a client device receives the mixed sample from mixer 264, the client device can play the mixed sample for the participant associated with the client device. When a client device receives the speaker/channel information, the client device may display some or all of the speaker/channel information to the participant associated with the client device.

In some embodiments, based on operation of or information from list application 262 or MCU 260, conference mixer 264 may determine the significance of each source (e.g., speaker) within a channel absolute or relative to the other sources in the same channel and/or in different channels or may indicate the most significant source to client devices.

Figure 5:
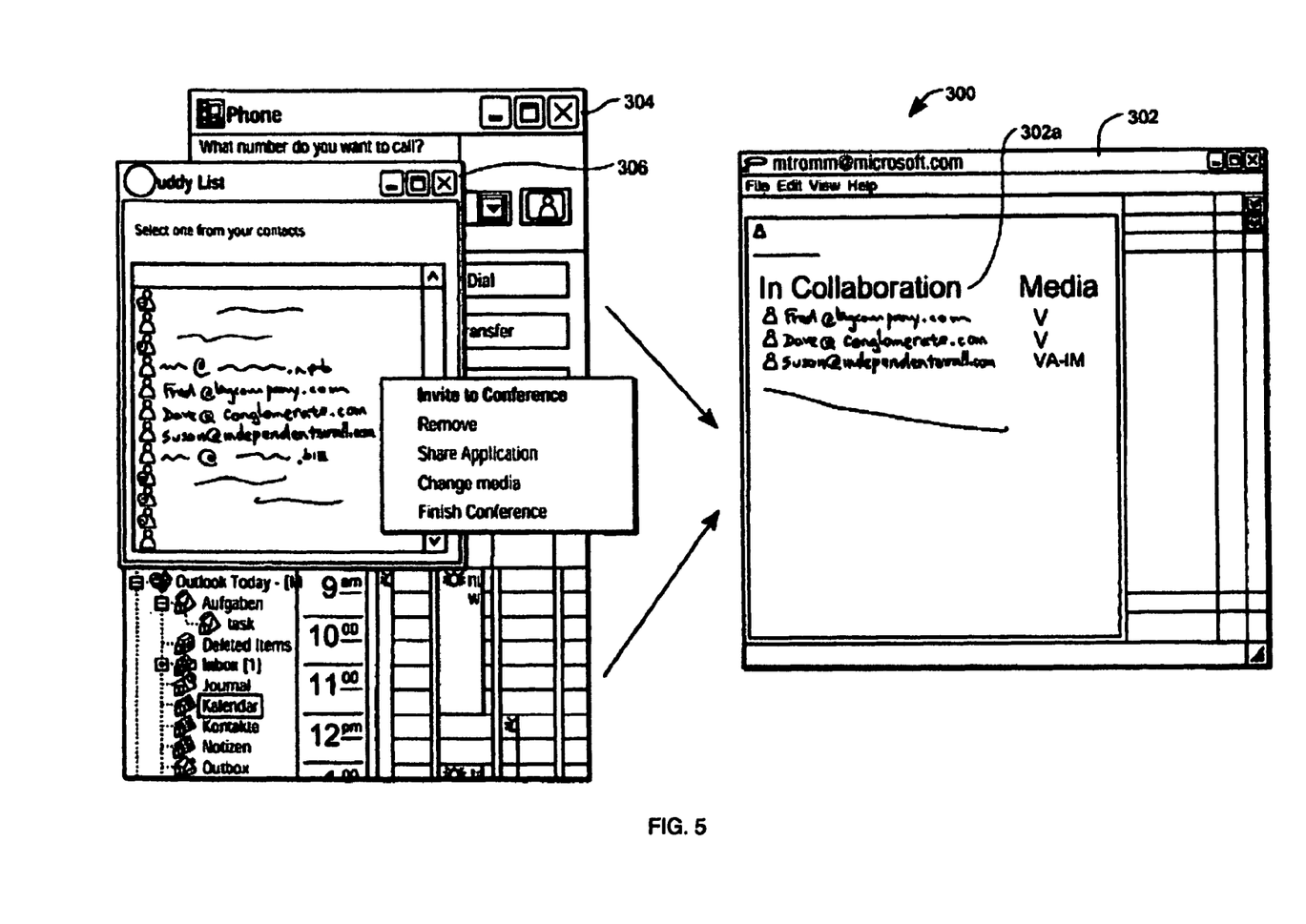
FIG. 5 is a diagram illustrating a graphical user interface according to some embodiments of the present invention.

Turning now to FIG. 5, a diagram of a graphical user interface 300 according to some embodiments is shown. In particular, shown are a variety of windows for invoking various functions. Such a graphical user interface 300 may be implemented on one or more of client devices 252, 254, 256, and 258. Thus, graphical user interface 300 may interact with interactive services unit 128 to control collaboration sessions or with MCU 260.

Shown are a collaboration interface 302, a phone interface 304, and a buddy list 306. It is noted that other functional interfaces may be provided. According to some embodiments, certain of the interfaces may be based on, be similar to, or interwork with, those provided by Microsoft Windows Messenger™ or Outlook™ software.

In some embodiments, buddy list 306 may be used to set up instant messaging calls and/or multimedia conferences. Phone interface 304 is used to make calls, e.g., by typing in a phone number, and also allows invocation of supplementary service functions such as transfer, forward, etc. Collaboration interface 302 allows for viewing the parties to a conference or collaboration 302a and the type of media involved. It is noted that, while illustrated in the context of personal computers 122, similar interfaces may be provided for telephones or cellular telephones or PDAs. During a conference or collaboration, participants in the conference or collaboration may access or view shared documents or presentations, communicate with each other via audio, voice, data and/or video channels, etc.

Figure 6:
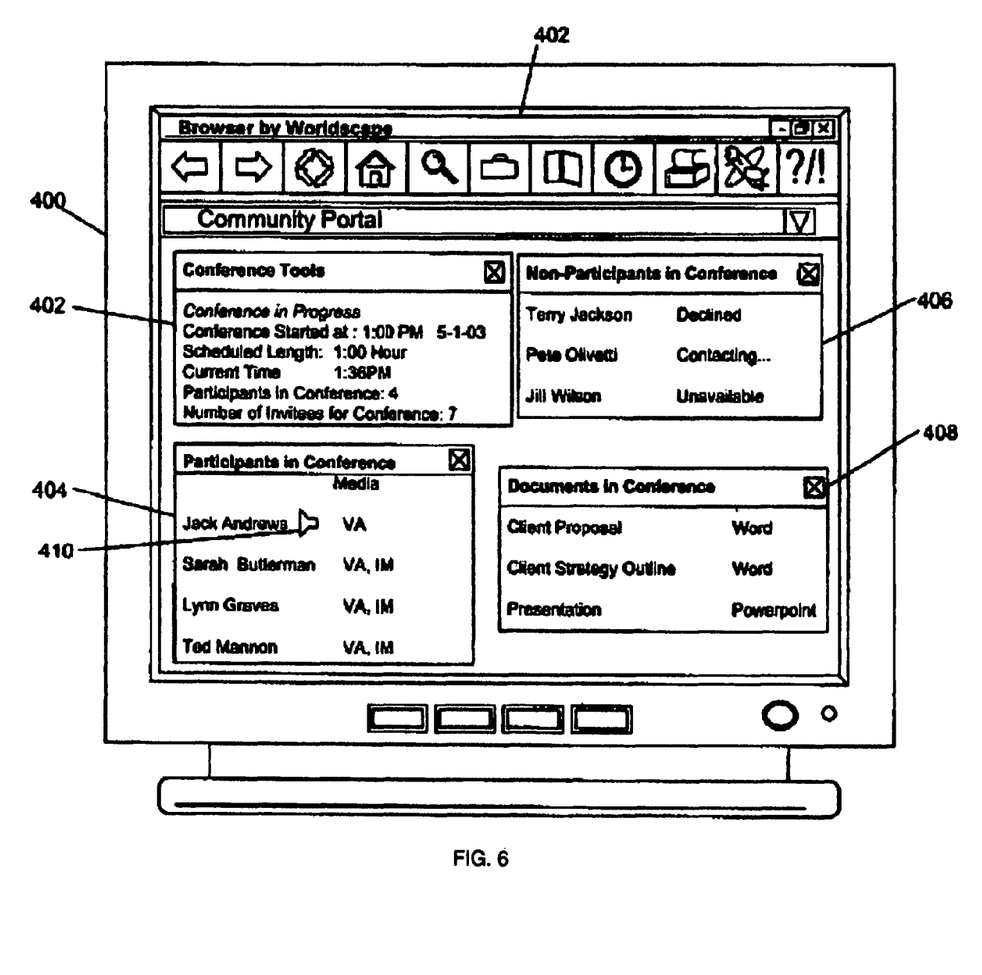
FIG. 6 is a diagram illustrating another graphical user interface according to some embodiments of the present invention.

Now referring to FIG. 6, a monitor 400 is illustrated that may be used as part of a client device (e.g., client device 302) by a user participating, initiating, or scheduling a conference. Monitor 400 may include a screen 402 on which representative windows or interfaces 402, 404, 406, and 408 may be displayed. In some embodiments, monitor 400 may be part of server 104 or part of a client device (e.g., 122a-122n, 252-258). While the windows or interfaces 302, 304, and 306 illustrated in FIG. 5 provided individual users or client devices (e.g., computer 122a) the ability to participate in conferences, send instant messages or other communications, etc., windows or interfaces 402, 404, 406, and 408 may allow a person using or located at server 104 and/or one or more of client computers 122a-122n the ability to establish or change settings for a conference, monitor the status of the conference, and/or perform other functions. In some embodiments, some or all of windows, 402, 404, 406, and 408 may not be used or displayed and/or some or all of windows 402, 404, 406, and 408 might be displayed in conjunction with one or more of windows 302, 304, and 306.

In some embodiments, one or more of windows 402, 404, 406, and 408 may be displayed as part of a "community portal" that may include one or more Web pages, Web sites, or other electronic resources that are accessible by users participating in a conference, a person or device monitoring, controlling or initiating the conference, etc. Thus, the "community portal" may include information, documents, files, etc. that are accessible to multiple parties. In some embodiments, some or all of the contents of the community portal may be established or otherwise provided by one or more people participating in a conference, a person scheduling or coordinating the conference on behalf of one or more other users, etc.

As indicated in FIG. 6, window 402 may include information regarding a conference in progress, the scheduled date of the conference (i.e., 1:00 PM on May 1, 2003), the number of participants in the conference, the number of invitees to the conference, etc. Window 404 includes information regarding the four current participants in the conference, the communication channels or media established with the four participants, etc. For example, the participant named "Jack Andrews" is participating in the conference via video and audio (e.g., a Web cam attached to the participant's computer). The participants named "Sarah Butterman," "Lynn Graves," and "Ted Mannon" are participating in the conference via video and audio channels and have IM capabilities activated as well. The participants named "Sarah Butterman," "Lynn Graves," and "Ted Mannon" may use the IM capabilities to communicate with each other or other parties during the conference.

In some embodiments, window 404 may display an icon 410 next to a participants name to indicate that the speaker is currently speaking during the conference. For example, the placement of icon 410 next to the name "Jack Andrews" indicates that he is currently speaking. When multiple participants are speaking, icons may be placed next to all of the participants currently identified as speaking during the conference. Thus, icons may appear next to different names in window 404 and then disappear as different speakers are talking during a conference. In some embodiments icon 410 may flash, change colors, change size, change brightness, etc. as further indication that a participant is speaking or is otherwise active in the conference.

As an alternative or an addition to placing an icon next to a participant's name when the participant is speaking during a conference, in some embodiments the participant's name may flash, change colors, change font type or font size, be underlined, be bolded, etc.

Window 406 includes information regarding three people invited to the conference, but who are not yet participating in the conference. As illustrated in window 406, the invitee named "Terry Jackson" has declined to participate, the invitee named "Jill Wilson" is unavailable, and server 104 or collaboration system 114 currently is trying to establish a connection or communication channel with the invitee named "Pete Olivetti."

Window 408 includes information regarding documents that may be used by or shared between participants in the conference while the conference is on-going. In some embodiments, access to and/or use of the documents also may be possible prior to and/or after the conference.

As stated above, embodiments of the present invention disclose presence-based automatic conference initiation with minimum conferee requirements. These embodiments enable a user in a presence based communication system to indicate a conference should be automatically initiated when a specified minimum subset of a pre-designated list of potential conferees become available.

Figure 7:
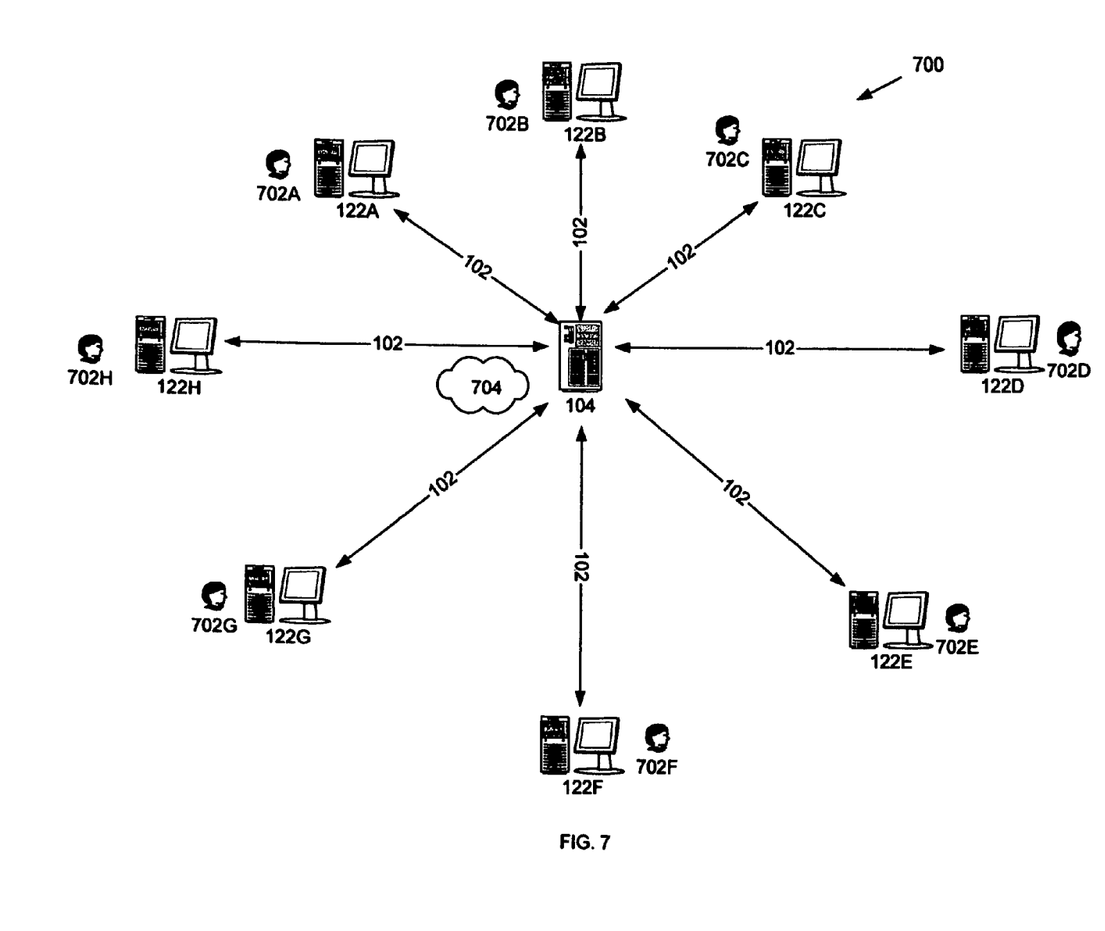
FIG. 7 is an automatic conference initiation system in an embodiment of the present invention of the present invention.

With reference to FIGS. 6 and 7, implementation of an automatic conference initiation system in an embodiment of the present invention is shown. As discussed in detail above, computers 122A-H are operably connected to server 104 through network 102. As stated above, server 104 can collect presence information 704 from users 702A-H. It is noted that only 8 users are shown in FIG. 7, however, an unlimited number of users could be served without departing from the spirit of the invention. Presence information 704 could be stored in Advanced Services Module 216 or it could be stored on computers 122. Further, as discussed above, server 104 could be used for initiating conferences for users 702A-H. This could be handled by Collaboration Module 202. Embodiments of the present invention disclose how users 702A-H can use presence information to automatically initiate a conference. Implementation of automatic conference initiation system 700 is made with reference to the example below.

User 702A, a presence based telecommunications system 10 user, is the manager of an important customer account. Seven of his direct and indirect employees 702B-H work on this account with user 702A. Users 702B-H are also presence based telecommunications system 10 users. User 702A often has team conferences with users 702B-H, so he has already set up a work group (e.g., a pre-designated list of users) containing users 702B-H.

The important customer is having misgivings about buying a new product. User 702A would like to discuss these issues with users 702B-H as soon as possible, and formulate a sales strategy before competitors interfere and take the case a presence based telecommunications system conference is begun. It is further contemplated that user 702A could specify the conference should start if the number of conferees or the required conferees requirement is satisfied before starting the conference. Further it is contemplated that a pre-determined time limit (defaulted or specified by the user) could elapse and automatically start the conference without departing from the spirit of the invention.

Figure 9:
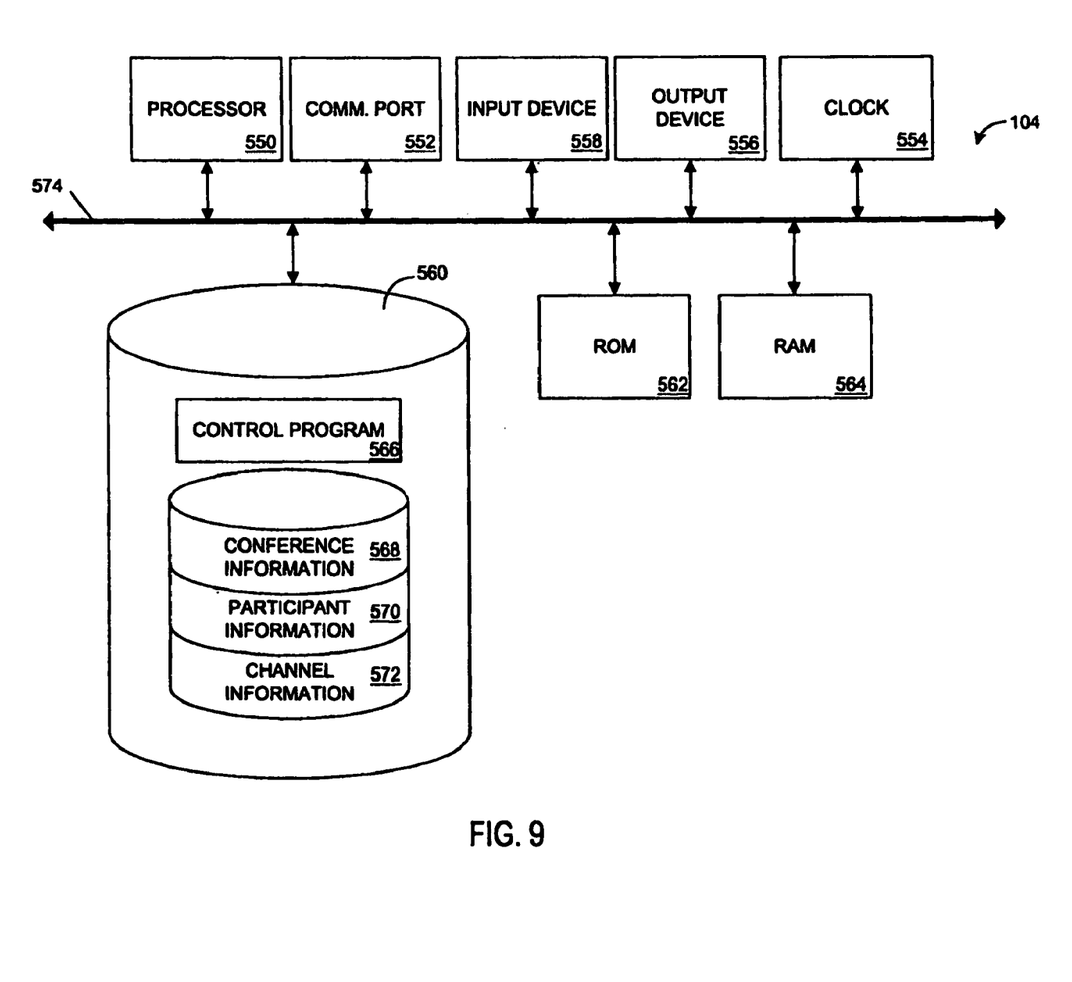
FIG. 9 is a block diagram of possible components that may be used in some embodiments of the server of FIG. 2 and FIG. 4.

Now referring to FIG. 9, a representative block diagram of a server or controller 104 is illustrated. Server 104 can comprise a single device or computer, a networked set or group of devices or computers, a workstation, mainframe or house computer, etc., and may include the components described above in regards to FIG. 2. In some embodiments, server 104 may be adapted or operable to implement one or more of the methods disclosed herein. Server 104 also may include some or all of the components discussed above in relation to FIG. 2 and/or FIG. 3.

Server 104 may include a processor, microchip, central processing unit, or computer 550 that is in communication with or otherwise uses or includes one or more communication ports 552 for communicating with user devices and/or other devices. Processor 550 may be operable or adapted to conduct, implement, or perform one or more of the elements in the methods disclosed herein.

Communication ports may include such things as local area network adapters, wireless communication devices, Bluetooth technology, etc. Server 104 also may include an internal clock element 554 to maintain an accurate time and date for server 104, create time stamps for communications received or sent by server 104, etc.

If desired, server 104 may include one or more output devices 556 such as a printer, infrared or other transmitter, antenna, audio speaker, display screen or monitor (e.g., monitor 400), text to speech converter, etc., as well as one or more input devices 558 such as a bar code reader or other optical scanner, infrared or other receiver, antenna, magnetic stripe reader, image scanner, roller important client's business. Because time is of the essence, User 702A does not want to wait until the regular Tuesday morning conference call to discuss this issue. However users 702B-H are very busy so user 702A speculates that initiating an impromptu conference is likely to fail to reach a number of users 702B-H.

Figure 8:
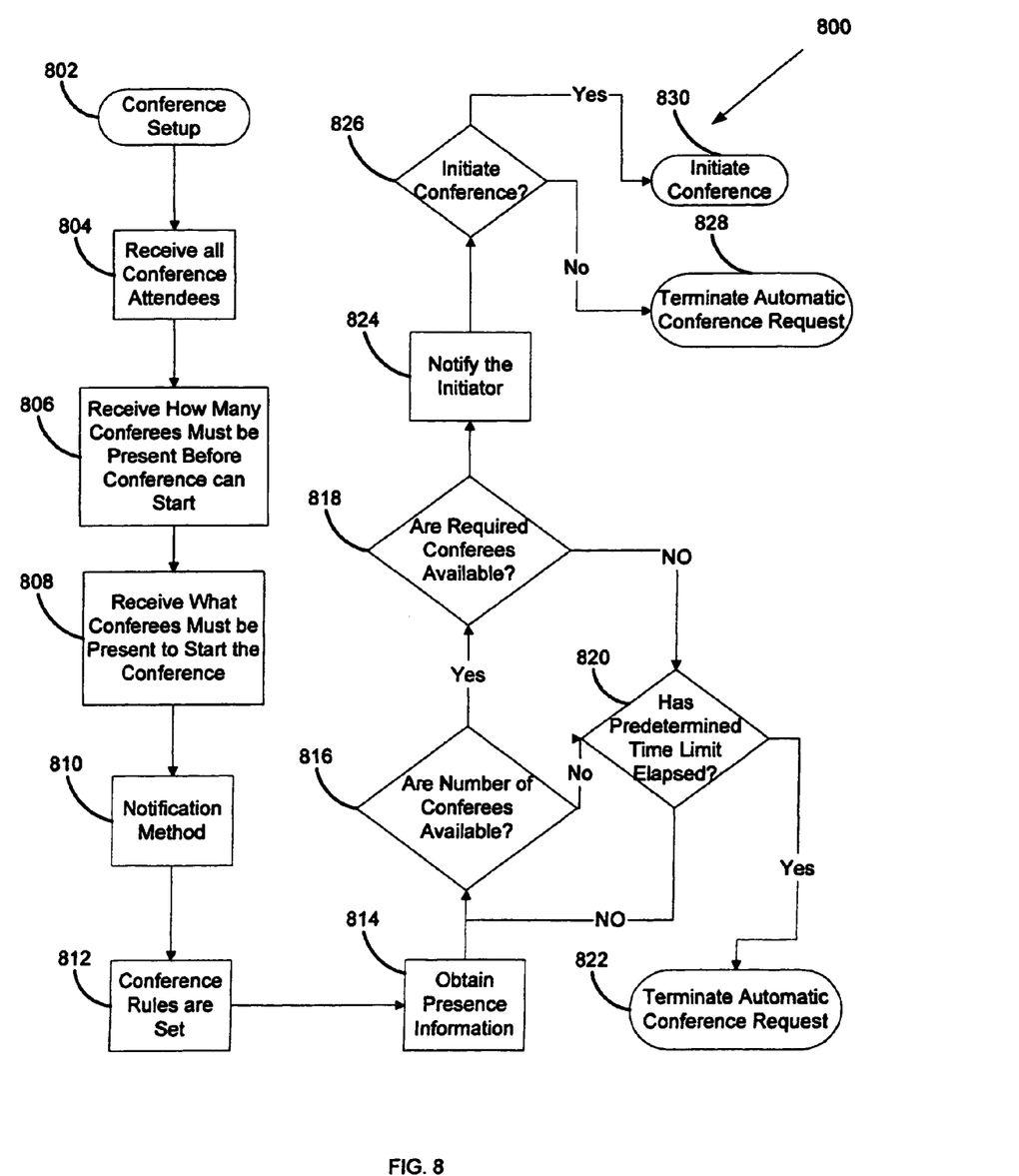
FIG. 8 is a flow chart diagram showing implementation of an automatic conference initiation system in an embodiment of the present invention.

To circumvent this possibility, user 702A utilizes presence based communication system 10 to initiate an embodiment of the present invention. Utilizing automatic conference initiation program 800 user 702A begins an automatic conference setup at state 802. User 702A can be prompted by graphical user interface 300 to input all conference attendees at state 804. Since user 702A has users 702B-H in a work group user 702A can simply indicate they would like the work group to attend the conference. This action means that when the conference is initiated, it will invite all the users 702B-H. User 702A can then input how many conferees must have a presence status of available before the conference can start at state 806. For example, 702A would like at least five conferees present before starting the conference At state 808, user 702A can input how many users/conferees 702B-H must have a presence status of available before the conference can begin. For example, user 702A wants user 702C and user 702G among the available members since they have been the lead sales person and systems engineer respectively with this important account for 10 years. User 702A can also select the method for program 800 to notify user 702A when the criteria specified is met at state 810. User 702A has chosen to be notified by a pop-up when the conference is ready to be initiated. However, user 702A could be notified by most any method, such as IM, SMS, email, or phone call without departing from the spirit of the invention. User 702A indicates they are completed setting up the conference initiation rules at state 812 and user 702A can go back to work perhaps working on the yearly budget.

When set, program 800 obtains the presence information for users/conferees 702B-H from server 104 at state 814. Users 702A-H can interact with network 102. A user may be any entity that may be associated with presence information, including a human being, an electronic device, a computer program, or other entity. Users 702A-H may have one or more presence states. Table 1 shows examples of presence states and descriptions of the presence states.

TABLE 1

| Presence State | Description |
| --- | --- |
| 'Available' | The subscriber is in the office and available to receive messages. |
| 'On the Phone' | The subscriber is in the office, but is on the phone. |
| 'In Office' | The subscriber is in the office. |
| 'Be Right Back' | The subscriber is in the office, but is not available. |
| 'In Meeting' | The subscriber is in the office, but is not available because they are in a meeting. |
| 'On Business Trip' | The subscriber is not in the office and is not available to receive messages. |
| 'Out of Office' | The subscriber is not in the office and is not available to receive messages. |
| 'On Vacation' | The subscriber is not available to receive messages. |
| 'No Interruptions' | The subscriber is in the office, but is not available to receive messages. |
| 'Working Remotely' | The subscriber is working and available, but not in the office. |
| 'Unknown' | It is not known whether the subscriber is available. |

The presence states shown in Table 1 may be applicable to an individual user 702. The presence states may also be applicable to other entities, including aggregate entities such as workgroups, group mailboxes or group phone connections. For example, a presence state may reflect the availability of a group of customer service representatives in a complaint department.

At state 816, program 800 determines if the required number of conferees 702B-H are available for a conference. This would be based upon conferees presence information. For example, if a conferees presence information was listed as "available" or "in office", then program 800 would list them as available towards satisfying the requirement of available conferees. Therefore, the conferees could be available for a voice call. If the required number of conferees 702 B-H were not available, then program 800 would proceed to state 820 and determine if a predetermined time limit set by user 702A expired. If the required number of conferees 702B-H is available, program 800 proceeds to state 818 where program 800 determines whether the required conferees are available.

If the required conferees are not available, then program 800 proceeds to state 820 where program 800 determines whether a predetermined time limit set by user 702A has expired. It is fully contemplated that other methods of automatic termination of the conference could be utilized, such as time of day (end of work day), time of week, if required conferee is on vacation, etc., without departing from the spirit of the invention. If the time limit has not expired, then program 800 proceeds to state 816 where it is once again determined if the required number of conferees are available. This assures that no one has become unavailable in the interim. If the time limit has expired, then program 800 proceeds to state 822 to terminate the automatic conference request. A notification can be sent to user 702A to notify them that the conference request failed.

If the required conferees are available, then program 800 notifies user 702A the conference initiator that a conference can begin at state 824. As stated above, this notice can come in any form such as IM, SMS, pop-up, or email without departing from the spirit of the invention. User 702A then has the option to not accept the automatic invitation to the conference, in which case program 800 proceeds to state 828 to terminate the automatic conference request. Or, user 702A has the option to proceed with the conference at state 830 in which ball, touch pad, joystick, touch screen, microphone, computer keyboard, computer mouse, etc.

In addition to the above, server 104 may include a memory or data storage device 560 (which may be or include memory 103 previously discussed above) to store information, software, databases, documents, communications, device drivers, etc. Memory or data storage device 560 preferably comprises an appropriate combination of magnetic, optical and/or semiconductor memory, and may include, for example, Read-Only Memory (ROM), Random Access Memory (RAM), a tape drive, flash memory, a floppy disk drive, a Zip™ disk drive, a compact disc and/or a hard disk. Server 104 also may include separate ROM 562 and RAM 564.

Processor 550 and data storage device 560 in server 104 each may be, for example: (i) located entirely within a single computer or other computing device; or (ii) connected to each other by a remote communication medium, such as a serial port cable, telephone line or radio frequency transceiver. In one embodiment, server 104 may comprise one or more computers that are connected to a remote server computer for maintaining databases.

A conventional personal computer or workstation with sufficient memory and processing capability may be used as server 104. In one embodiment, server 104 operates as or includes a Web server for an Internet environment. Server 104 may be capable of high volume transaction processing, performing a significant number of mathematical calculations in processing communications and database searches. A Pentium™ microprocessor such as the Pentium III™ or IV™ microprocessor, manufactured by Intel™ Corporation may be used for processor 550. Equivalent processors are available from Motorola™, Inc., AMD™, or Sun Microsystems™, Inc. Processor 550 also may comprise one or more microprocessors, computers, computer systems, etc.

Software may be resident and operating or operational on server 104. The software may be stored on data storage device 560 and may include a control program 566 for operating the server, databases, etc. Control program 566 may control processor 550. Processor 550 preferably performs instructions of control program 566, and thereby operates in accordance with the embodiments described herein, and particularly in accordance with the methods described in detail herein. Control program 566 may be stored in a compressed, uncompiled and/or encrypted format. Control program 566 furthermore includes program elements that may be necessary, such as an operating system, a database management system and device drivers for allowing processor 550 to interface with peripheral devices, databases, etc. Appropriate program elements are known to those skilled in the art, and need not be described in detail herein.

Server 104 also may include or store information regarding users, user devices, conferences, alarm settings, documents, communications, etc. For example, information regarding one or more conferences may be stored in a conference information database 568 for use by server 104 or another device or entity. Information regarding one or more users (e.g., invitees to a conference, participants to a conference) may be stored in a user information database 570 for use by server 104 or another device or entity and information regarding one or more channels to client devices may be stored in a channel information database 572 for use by server 104 or another device or entity. In some embodiments, some or all of one or more of the databases may be stored or mirrored remotely from server 104.

In some embodiments, the instructions of the control program may be read into a main memory from another computer-readable medium, such as from ROM 562 to RAM 564. Execution of sequences of the instructions in the control program causes processor 550 to perform the process elements described herein. In alternative embodiments, hard-wired circuitry may be used in place of, or in combination with, software instructions for implementation of some or all of the methods described herein. Thus, embodiments are not limited to any specific combination of hardware and software.

Processor 550, communication port 552, clock 554, output device 556, input device 558, data storage device 560, ROM 562, and RAM 564 may communicate or be connected directly or indirectly in a variety of ways. For example, processor 550, communication port 552, clock 554, output device 556, input device 558, data storage device 560, ROM 562, and RAM 564 may be connected via a bus 574.

While specific implementations and hardware configurations for server 104 have been illustrated, it should be noted that other implementations and hardware configurations are possible and that no specific implementation or hardware configuration is needed. Thus, not all of the components illustrated in FIG. 9 may be needed for server 104 implementing the methods disclosed herein.

The methods described herein may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, many, if not all, of the elements for the methods described above are optional or can be combined or performed in one or more alternative orders or sequences without departing from the scope of the present invention and the claims should not be construed as being limited to any particular order or sequence, unless specifically indicated.

Each of the methods described above can be performed on a single computer, computer system, microprocessor, etc. In addition, two or more of the elements in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for automatic conference initiation, the method comprising the steps of:
    providing a server comprising at least one controller and memory;
    the server receiving a conference request identifying a number of conferees for a conference;
    the server determining whether each conferee for the conference is present for the conference by evaluating at least one presence feature stored in a repository for at least one conferee device, the at least one conferee device comprising at least one of an SIP registered device and a non-SIP device;
    the server determining if the conferees are available for the conference based upon the determined presence of the conferees; and
    the server initiating a sending of a notification notifying a conference initiator that a predetermined number of conferees are available to begin the conference.

2. The method of claim 1, further comprising the step of the server receiving input on the predetermined number of conferees that must be present before the conference can begin.

3. The method of claim 1, further comprising the step of the server receiving input on required conferees that must be present before the conference can begin.

4. The method of claim 1, further comprising the step of the server receiving notification instructions on how to notify the conference initiator when the conference can begin.

5. The method of claim 1, wherein the server determining the presence of each conferee by obtaining presence information comprising the at least one presence feature from at least one of a buddy list, a list application, a conferee invitee list, and the at least one conferee device for each conferee.

6. The method of claim 1, wherein the step of determining if the conferees are available for the conference includes determining if a predetermined number of conferees are available for the conference.

7. The method of claim 1, wherein the step of determining if the conferees are available for the conference includes determining if required conferees of the conference are available for the conference.

8. An automatic conference initiator system comprising:
    a memory comprising:
        an automatic conference initiator program that initiates a conference when conferees are determined available based upon presence information; and
    at least one processor coupled to the memory that executes the automatic conference initiator program; and
    wherein the conference initiator program is configured to cause the automatic conference initiator system to perform a conference initiation method for automatic conference initiation when the automatic conference initiator program is executed by the at least one processor, the method for automatic conference initiation comprising:
        determining whether each conferee for a conference identified in a conference request is present for the conference by evaluating at least one presence feature stored in a repository for at least one conferee device, the at least one conferee device comprising at least one of an SIP registered device and a non-SIP device;
        determining if the conferees are available for the conference based upon the determined presence of the conferees; and
        sending a notification notifying a conference initiator that a predetermined number of conferees are available to begin the conference.

9. The system of claim 8, wherein the method for automatic conference initiation further comprises notifying the conference initiator when the conference can begin.

10. The system of claim 8, wherein the method for automatic conference initiation further comprises determining if the conference initiator wants to begin the conference.

11. The system of claim 8, wherein the processing program receives input designating all the conferees from a conference initiator.

12. The system of claim 8, wherein the method for automatic conference initiation further comprises receiving input designating a number of the conferees that must be available before the conference can begin.

13. The system of claim 8, wherein the method for automatic conference initiation further comprises receiving input designating required conferees that must be available before the conference can begin.

14. A machine readable medium comprising machine executable instructions, the instructions comprising:
    receive instructions that receive inputted conferees to a scheduled conference;
    determination instructions that determine if the conferees are available based upon presence information obtained by evaluating at least one presence feature stored in a repository for at least one conferee device for each of the received inputted conferees, the at least one conferee device comprising at least one of an SIP registered device and a non-SIP device; and
    notification instructions configured to cause a transmission of a notice that notify a conference initiator if a predetermined number of conferees are available.

15. The method of claim 1, wherein the notification notifying a conference initiator that a predetermined number of conferees are available to begin the conference is at least one of an instant message (IM), a short messaging service (SMS) message, an electronic message, a pop-up message, a voice message, and a phone call.

16. The method of claim 1 further comprising the server receiving rules from each conferee of the conference that define media handling; and
    the server receiving set action cues from each conferee that define whether a launching of an action prompt window at the at least one conferee device for each conferee should be initiated.

17. The method of claim 1 further comprising the server establishing the conference; wherein the server also comprises a multi-channel conferencing unit and wherein the multi-channel conferencing unit determines how many conferees share a channel in the conference and/or detect which conferee of a conference speaks.

18. The method of claim 17 wherein the multi-channel conference unit is also configured to detect which channel is being used by a client device for each conferee during the conference.

19. The method of claim 17 wherein the multi-channel conferencing unit is configured to detect a level of activity for each conferee that participates in the conference and indicate a level of activity for each conferee during the conference.

20. The method of claim 17 wherein the conference is established by the server interconnecting the at least one conferee device of at least a portion of the conferees of the conference.

\* \* \* \* \*